C. F. DIECKMANN.
OPEN FACE RUNNER FOR SLIDE RULES.
APPLICATION FILED SEPT. 4, 1914.
1,158,459.
Patented Nov. 2, 1915.
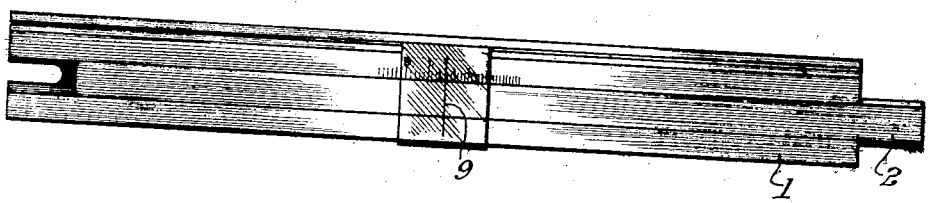
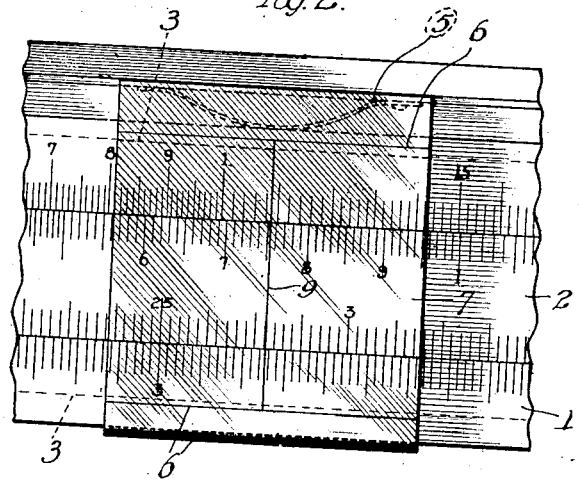
Witnesses:
Robert H. Weir
Arthur W. Carson
Inventor
Carl F. Dieckmann
Cheever & Cox
Attys.

UNITED STATES PATENT OFFICE.

CARL F. DIECKMANN, OF CHICAGO, ILLINOIS, ASSIGNOR TO EUGENE DIETZGEN COMPANY, FACTORY, OF CHICAGO, ILLINOIS, A CORPORATION OF ILLINOIS.

OPEN-FACE RUNNER FOR SLIDE-RULES.

1,158,459. Specification of Letters Patent. Patented Nov. 2, 1915.

Application filed September 4, 1914. Serial No. 860,140.

*To all whom it may concern:*

Be it known that I, CARL F. DIECKMANN, a citizen of the United States, residing at Chicago, in the county of Cook and State of Illinois, have invented a certain new and useful Improvement in Open-Face Runners for Slide-Rules, of which the following is a specification.

My invention relates to runners for slide rules, and the object of the invention is to produce a runner in practical commercial form which will afford free vision at the ends of the runner and will afford maximum field of vision and avoid obscuring the figures adjacent to the marginal edges of the rule.

I accomplish my object by the construction shown in the accompanying drawings in which—

Figure 1 is a top or face view of a runner embodying my invention and showing the same in position on a slide rule. Fig. 2 is a view of the runner as in Fig. 1 but drawn to an increased scale. Fig. 3 is a transverse section of the parts shown in Fig. 2. In this, the preferred form of runner, the glass plate which forms the main body thereof is formed in three layers, the intermediate layer being narrower and consequently affording two marginal grooves for receiving the edges of the side guides. Fig. 4 is a transverse section of a modified form of runner in which the body of the runner is formed of a single piece of glass with grooves in the edges formed by sawing or otherwise cutting away the glass itself. In this form the side guides are held in place by cement. Fig. 5 is similar to Fig. 4 except that the side guides instead of being held by cement are formed with a series of pockets or depressions into which the glass is pressed while in a plastic condition.

Similar numerals refer to similar parts throughout the several views.

Referring to the form shown in the first three figures of the drawings, the rule itself consists of a body 1 and a slide 2. These are in the usual form. Two parallel marginal grooves 3, 3 are formed in the edges of the rule and these receive the lower flanges 4, 4 of the side guides. These guides are preferably made of metal and one of them is provided with a spring 5 which bears against the edges of the rule for retarding the movement of the runner and holding it in position when set. The side guides are also provided with inwardly extending flanges 6, 6 which enter marginal grooves in the edges of the runner plate or body. In all forms of my device the runner plate is of glass and at the ends is entirely free from frame work of any kind which would tend to obscure the vision. In fact, the plate is thick and strong enough to dispense with all frame work and the side guides are secured directly to it. In the preferred form shown in Fig. 3, the plate 7 consists of three layers, the intermediate one whereof is narrower than the others, thus forming marginal grooves for receiving the upper flanges 6, 6 of the guides. The parts are so proportioned that said flanges 6 project little, if any, over the edge of the rule while the plate projects to the edge of the rule if not actually beyond it. The result is that the metal of the side guides does not overlie any appreciable portion of the top surface of the rule and substantially the entire upper surface of the rule is visible at all times. For convenience the marginal edges of the plate are beveled at the top to render the device more convenient to handle.

The form of runner shown in Fig. 4 is in all chief respects the same as in Fig. 3. The difference is mainly that in this modified form the plate 8 which corresponds with plate 7$^a$ is formed of a single piece of glass and the grooves or rabbets formed in the marginal edges are produced by sawing or otherwise cutting away the material. In this form the upper flanges 6 are cemented in place.

The form shown in Fig. 5 is the same as that shown in Fig. 4, the only difference being that the upper flanges 6$^a$ have a number of pockets 6$^b$ formed in the upper surface and the glass plate 7$^b$ instead of being cemented to the flange is heated until it becomes plastic and then pressed so that a portion of the glass will enter the pockets and form a permanent fastening for the parts. It will be understood, of course, that in all forms of the device the glass plate is provided with a transverse reading line 9 shown in Figs. 1 and 2.

From the foregoing it will be evident that in my runner there is nothing at the ends to obstruct a view of the face of the rule. All the scales on the rule can be read as freely as if the runner were absent. As to the upper and lower marginal edges of the runner, the only opaque things are the upper flanges 6, 6 of the side guides and with respect to these, the width of the plate is such and the side guides are so formed that the said upper flanges 6 project but slightly, if any, over the surface of the rule. Consequently, all of the squares on the rule can be easily read at all times and yet the construction is strong and simple and the device consists of but three principal parts; to-wit, the glass plate itself and the two side guides. Furthermore, as the flanges 6 are lower than they would be if overlying the glass, offer less obstruction to vision when the rule is viewed obliquely from the side. Another important characteristic of my slide rule viewed from a practical standpoint is that on account of the flange and groove connection between the plate and the side guides, cementing and welding processes are possible instead of the employment of screws or equivalent fastening elements or the employment of frame pieces running transversely to the rule and consequently obscuring a portion of the scales thereof. My construction therefore makes it possible to reduce the number of parts and dispense with all surface projections. In my runner the entire upper surface is of smooth glass without projections of any kind and without corners or recesses which in ordinary runners tend to collect grease and dirt and render the rule unsightly.

Having thus described my invention, what I claim as new and desire to secure by Letters Patent, is:

An open face runner for slide rules comprising a glass element formed in three separate layers cemented together, the upper and lower layers being of approximately the same width as the surface of the rule and the intermediate layer being appreciably narrower to thereby form grooves in the edges of the element, and side guides adapted to engage the rule, said guides having flanges entering the grooves in said glass element.

In witness whereof, I have hereunto subscribed my name in the presence of two witnesses.

CARL F. DIECKMANN.

Witnesses:
 HOWARD M. COX,
 KATHRYN S. READY.